United States Patent [19]

Schofield

[11] Patent Number: 4,785,710
[45] Date of Patent: Nov. 22, 1988

[54] HELICOPTER

[75] Inventor: James W. Schofield, Sherborne, England

[73] Assignee: Westland plc, Yeovil, England

[21] Appl. No.: 887,532

[22] Filed: Jul. 21, 1986

[30] Foreign Application Priority Data

Jul. 25, 1985 [GB] United Kingdom ............... 8518794

[51] Int. Cl.[4] .................... F41F 3/04; F41F 3/06
[52] U.S. Cl. .................... 89/1.801; 89/1.804; 89/1.805; 89/1.815
[58] Field of Search ............. 89/1.801, 1.805, 1.802, 89/1.803, 1.804, 1.815, 1.819, 1.8; 244/17.11

[56] References Cited

U.S. PATENT DOCUMENTS

| | | | |
|---|---|---|---|
| 2,837,970 | 6/1958 | Helstrom | 89/1.803 |
| 2,975,676 | 3/1961 | Butler | 89/1.815 X |
| 2,984,157 | 5/1961 | Johnstone | 89/1.802 X |
| 2,997,923 | 8/1961 | Kempton | 89/1.804 |
| 3,166,975 | 1/1965 | Landstrom et al. | 89/1.802 |
| 3,228,295 | 1/1966 | Kane et al. | 89/1.802 |
| 3,316,808 | 5/1967 | Mais | 89/1.804 |
| 4,318,328 | 3/1982 | Rona | 89/1.815 |
| 4,429,611 | 2/1984 | Oldham et al. | 89/1.819 X |

*Primary Examiner*—David H. Brown
*Attorney, Agent, or Firm*—Larson & Taylor

[57] ABSTRACT

A helicopter (10) has a fuselage (11) provided with storage means (19, 20, 24) for storing a plurality of missiles (16) longitudinally of the fuselage, reloadable turret means (17) beneath the fuselage for movement in azimuth and elevation and transfer means (20b, 21) for transferring a missile from the storage means to the turret means. In the illustrated embodiment the missiles are stored externally of generally vertical side walls (13) and a lower generally horizontal wall (14) of the fuselage and fairings (39) are provided to protect the externally mounted missiles.

12 Claims, 4 Drawing Sheets

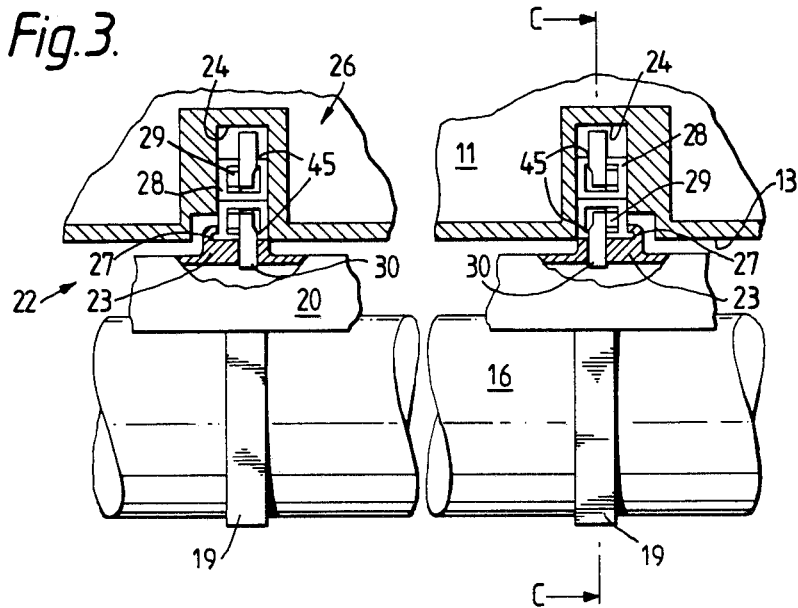
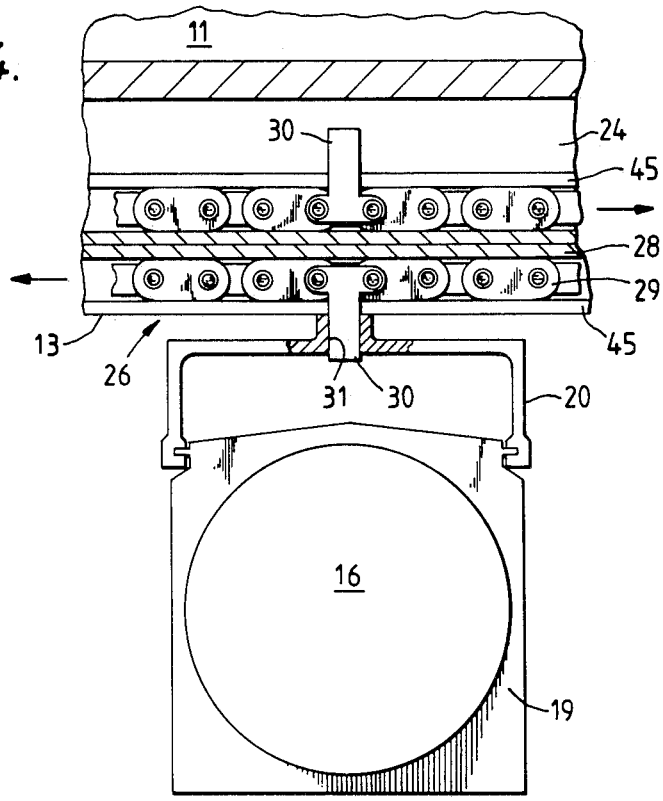

4,785,710

HELICOPTER

DESCRIPTION OF INVENTION

This invention relates to helicopters and is particularly concerned with helicopters having missile transporting and launching apparatus.

In the context of this invention the term "missile" is to be construed as including missiles, rockets or other projectiles and includes devices that are normally stored, transported and launched from a tubular cannister.

It is known to provide a helicopter with missile transporting and launching apparatus. Normally, such apparatus comprise outriggers extending laterally from both sides of the fuselage and each adapted to carry a plurality of missiles. Such outboard mountings have a large drag penalty and are complex and heavy because each missile must have its own mounting and an umbilical connection to connect with a pilot-operated firing means. Normally, the missile mounting is movable in elevation; however, since all the missiles have to be moved in unison this requires two heavy elevation motors and operating mechanisms, one on each side of the helicopter. Furthermore since the missiles are in the open considerable problems can occur as a result of vibration, icing etc.

An unpublished proposal to overcome these problems is contained in our pending European Patent Application No. 85301681.4. In that proposal, a plurality of missiles are to be stored transversely in a fuselage, transfer means being provided to selectively transfer a missile from storage to a launcher means located at the outer end of an outrigger at the side of the fuselage. Since all of the missiles are to be carried within the fuselage this proposal virtually eliminates the drag penalty associated with conventional external carriage arrangements and also eliminates environmental problems associated with carrying missiles externally. However, the necessity to store the missiles transversely limits this proposal to use with wide bodied helicopters. Moreover, whilst there is provision for some movement in azimuth as well as in elevation, such movement is necessarily limited by the proximity of the sides of the fuselage.

According to the present invention, a helicopter having a fuselage includes storage means for storing a plurality of missiles longitudinally of the fuselage, reloadable turret means beneath the fuselage for movement in azimuth and elevation, and transfer means for transferring a missile from said storage means to said turret means.

Conveniently said storage means comprise a plurality of longitudinally spaced-apart adaptors attached to the missiles and slidably located in support channels having longitudinally spaced-apart attachment lugs located in generally vertical tracks in the side walls and lower wall of the fuselage.

Drive means may be provided for driving the support channels and attached missiles down the vertical tracks and into a transfer position generally beneath said lower wall for transferring selectively to said turret means.

Preferably the drive means comprise powered endless chains located in said tracks and may include protruding spigots for engagement in mating apertures in the attachment lugs on the support channels.

The transfer means may comprise a powered endless chain for sliding the adaptors and an attached missile forwardly out of the support channel and into a mating channel on the turret means. The transfer means may include a transfer channel bridging a space between the storage means and the turret means. Conveniently the endless chain includes at least two protruding spigots for engagement in transfer adaptors attached adjacent the ends of a missile.

In one embodiment the storage means is arranged to support the missiles externally of the vertical side walls and the lower horizontal wall of the fuselage and the vertical tracks of the storage means may be formed within the side walls and the lower wall of the fuselage so as to be generally flush with the respective outer surfaces.

Fairings may be provided to protect the externally mounted missiles.

Preferably, the turret means supports two missiles in side by side relationship.

The invention will now be described by way of example only and with reference to the accompanying drawings, in which:

FIG. 3 is a fragmentary part sectioned elevation taken along lines B—B of FIG. 2;

FIG. 4 is a fragmentary sectioned elevation taken along lines C—C of FIG. 3.

Figure 1:
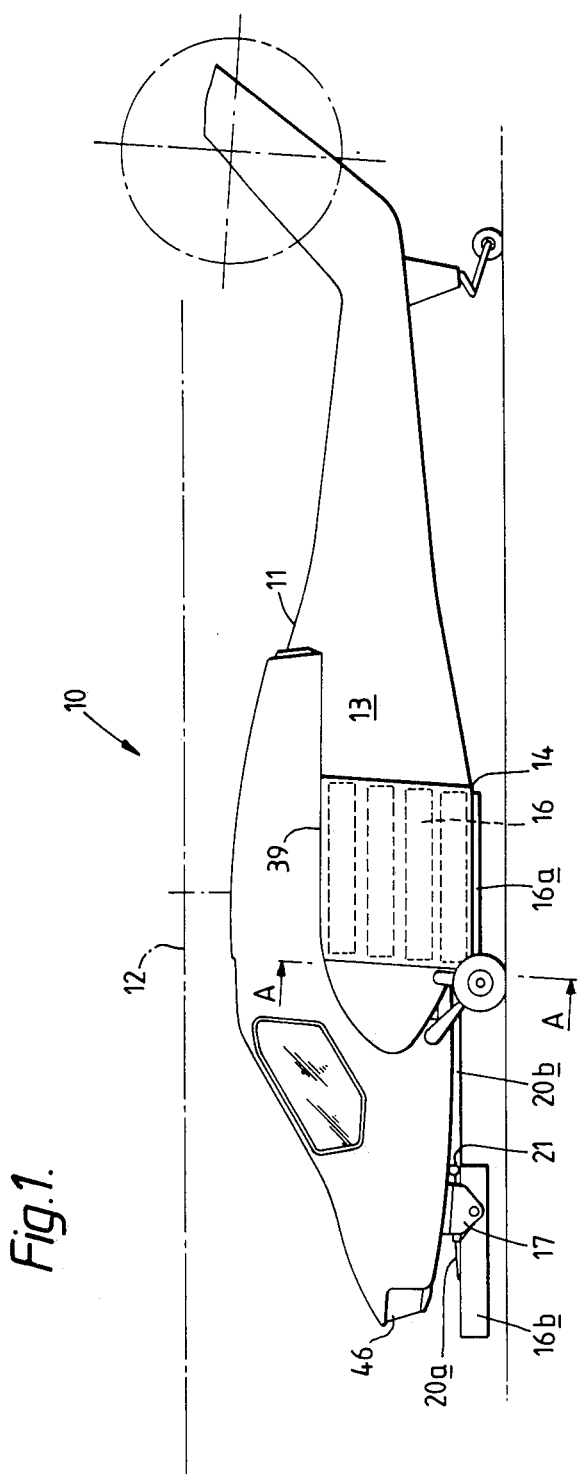
FIG. 1 is a side elevation of a helicopter constructed in accordance with the invention.

A helicopter 10 incldues a fuselage 11 supported by a main sustaining rotor 12. The fuselage 11 has generally vertical side walls 13 joined to a generally horizontal lower wall 14 by radiussed portions 15.

A plurality of missiles 16 are stored longitudinally of the fuselage 11 and in the illustrated embodiment, externally of the side walls 13 and of the horizontal lower wall 14. The two missiles 16a located generally beneath the lower wall 14 are in a transfer position from which they can be transferred to a turret means 17 located beneath the lower wall 14 and forwardly of the stored missiles 16, as illustrated at 16b in FIGS. 1 and 5.

First guide means 18 (FIG. 2) comprise two longitudinally spaced-apart adaptors 19 attached to each missile 16 and having opposed extending lugs located for sliding movement in slots in a longitudinally extending support channel 20. The turret 17 has a pair of side by side channels 20a similar in cross-sectional shape to channel 20 and the spacing between the storage location of the missiles 16 and the turret 17 is bridged by a pair of side by side transfer channels 20b again of similar cross-sectional shape.

Figure 5:
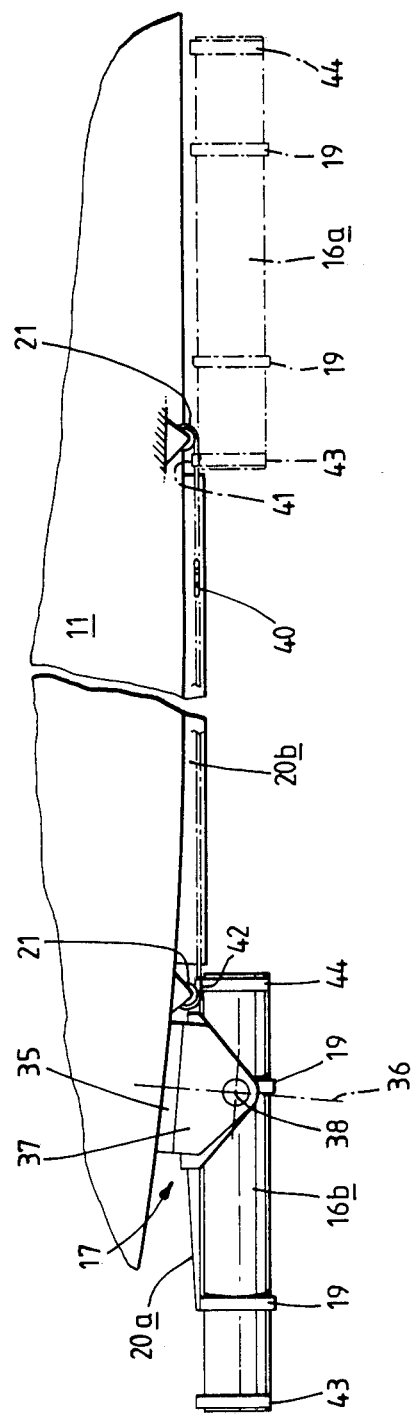
FIG. 5 is a fragmentary view of part of FIG. 1 on an enlarged scale and illustrating a particular feature of the invention.

In FIG. 5 the closer of the two transfer channels 20b has been omitted for clarity. First drive means comprising a pair of side by side endless chains 40 (one only being shown) are routed around longitudinally spaced-apart pulley wheels 21 at least one of which is powered. Each chain 40 includes first and second spaced-apart spigots 41 and 42 respectively for engagement during operation in first and second transfer adaptors 43 and 44 attached to each missile 16 adjacent the front adn rear ends thereof.

Each support channel 20 is associated with second guide means 22 (FIG. 3) comprising longitudinally spaced-apart attachment lugs 23 located in vertical tracks 24 within the side-walls 13 and lower wall 14 of the fuselage 11 so as to be generally flush with the respective outer surfaces. The lugs 23 engage external lips 27 formed on a chain guide housing 28 located in each of the tracks 24 in order to locate the support channel 20 and its attached missile 16 longitudinally whilst permitting downward sliding movement along the tracks 24. A gap 25 (FIG. 2) in the tracks 24 is located in the lower wall 14 and symmetrically of a vertical centreline 47 of the fuselage 11 for a purpose to be hereinafter described.

Second drive means 26 (FIGS. 2, 3 and 4) comprise a powered endless chain 29 located in the guide housings 28 and carrying spigots 30 protruding through slotted external walls 45 of the housing 28 for engagement in mating apertures 31 in the attachment lugs 23 on each channel 20. The chains 29 run around end rollers 32 (FIG. 2) and as will be clear from FIG. 4, a loaded spigot 30 is moved in the direction indicated to move the missile 16 towards the transfer position and an unloaded spigot 30 moves in the opposite direction to pick up another missile during re-loading.

Figure 2:
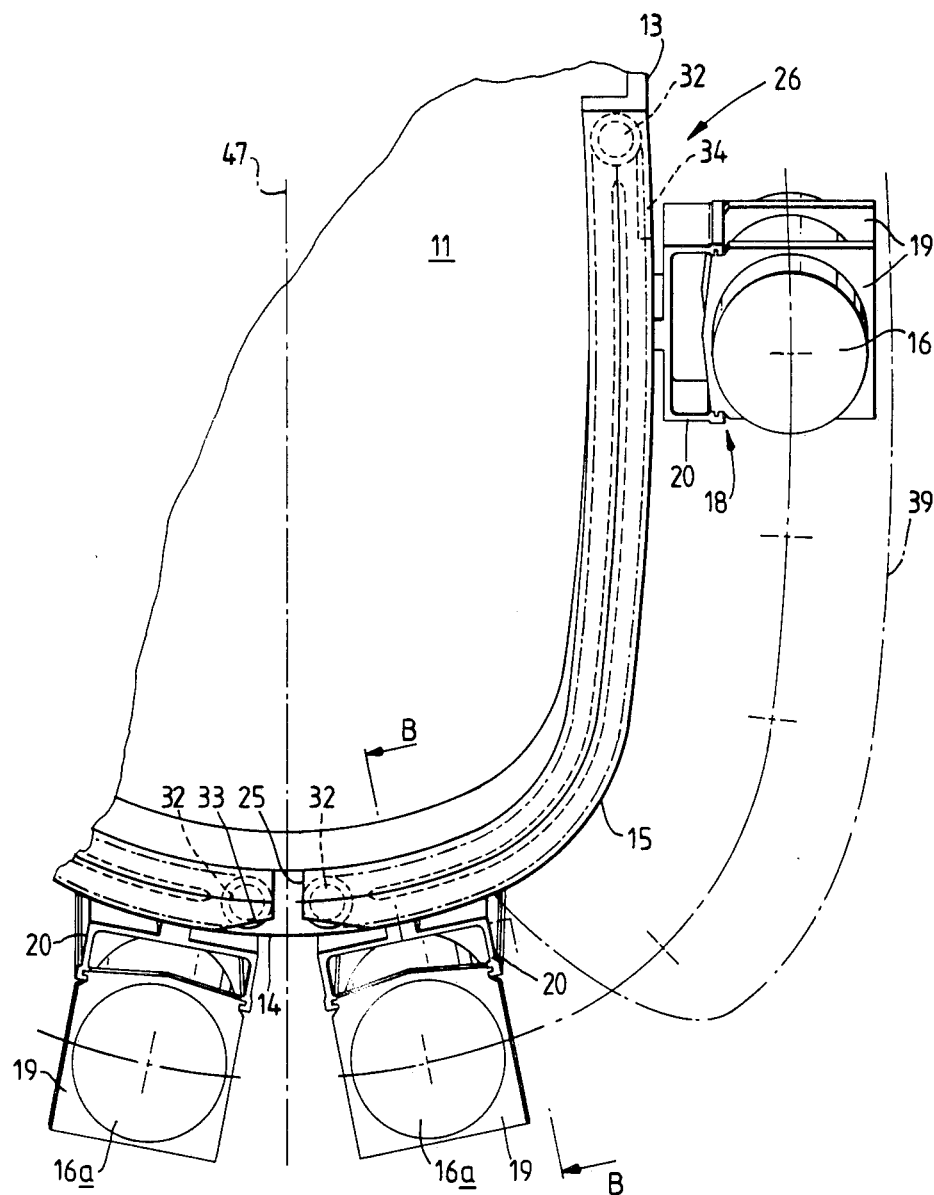
FIG. 2 is a fragmentary cross section taken along lines A—A of FIG. 1.

As illustrated in FIG. 2 the external lips 27 are removed from a portion 33 of the chain guide housings 28 approaching the gap 25 between the respective tracks 24, and from a portion 34 of the chain guide housings 28 at the upper ends of the tracks 24.

Referring now to FIG. 5, the turret 17 includes a housing 35 rotatably mounted on the fuselage 11 for rotation about a generally vertical axis 36. A motor (not shown) is provided to drive the turret 17. A pair of spaced-apart depending lugs 37 support the two side-by-side channels 20a which are identical in cross-section to the support channels 20 associated with each missile 16 as hereinbefore described.

Drive means, e.g. a hydraulic jack (not shown), is provided to rotate the channels 20a in unison about a generally horizontal axis 38.

Means (not shown) for automatically connecting the necessary electrical connections to the missiles when located on the turret 17 are also located in the housing 35, and locking means (not shown) are provided for locking the missile in a firing position.

Fairings, generally indicated at 39 in FIGS. 1 and 2 are provided to protect the stored missiles 16 and reduce aerodynamic drag.

A sighting device 46 mounted in the nose of the fuselage 11 is provided for use with the apparatus of the present invention.

Referring to FIG. 5, when it is desired to load the turret 17 it is first adjusted so that the empty channels 20a are correctly aligned with the transfer channels 20b and therefore the support channels 20 of the two missiles 16a (shown in broken outline) in the transfer position beneath the lower wall 14 of the fuselage 11. The roller 21 is energised to drive chain 40 so that first spigot 41 engages first transfer adaptor 43 at the front of missile 16a to slide the missile 16a forwardly along support channel 20 and transfer channel 20b to engage in aligned channel 20a on the turret 17. It will be apparent that as the missile 16a is pulled along transfer channel 20b the second spigot 42 automatically engages the second transfer adaptor 44 at the rear of missile 16a so as to push the missile 16a fully into the firing position illustrated at 16b in FIGS. 1 and 5. The longitudinally spaced-apart adaptors 19 ensure adequate support and guidance of the missile during the transfer operation The transfer operation leaves two empty channels 20 in the transfer position on the lower wall 14, and the respective endless chains 29 are operated to move the empty channels 20 until the attachment lugs 23 are disengaged from the tracks 24 to drop out through the gap 25 and enable the respective channels 20 to fall away from the helicopter. The portion 33 of the chain guide housings 28 at the lower end of each pair of tracks 24 from which the lip 27 is removed in the illustrated embodiment enables the empty support channels 20 from both tracks 24 to be dropped simultaneously, rather than one at a time.

This movement to eject the channels 20 of fired missiles from the tracks 24 automatically brings the next missiles 16 from store into the transfer positions 16a illustrated in FIGS. 1 and 2, and the arrangement ensures that in an emergency the entire load of missiles 16 can be jettisoned quickly and safely from the storage position. Jettison means (not shown) are provided on the turret 17 for jettisoning the cannisters of cannister-mounted missiles after firing, although it is possible to use the first drive means to return the empty cannisters to the vacant transfer positions 16a and jettison them along with the channels 20 as hereinbefore described.

Once loaded on the turret 17, a missile 16 is locked in position and the electrical supplies connected automatically. The position of the turret 17 is controlled by the helicopter crew either manually or by slaving the movement of the turret 17 to movement of the nose mounted sight 46.

The portion 34 of the chain guide housing 28 at the upper end of each pair of tracks 24 from which the lip 27 is removed enables a support channel 20 to be engaged with the lips 27 and the protruding spigots 30 as illustrated in FIGS. 3 and 4, for loading missiles. In this respect it will be noted that a support channel 20 can be fitted either with a missile 16 in position or on its own, in which case the missile 16 is loaded independently.

Thus, in the helicopter of this ivention, the turret 17 is movable in both elevation and a wide azimuth angle to provide a wide firing arc which means that the missiles 16 can be aligned to the firing direction without having to point the entire helicopter in that direction. The missiles 16 are stored longitudinally of the fuselage which permits the helicopter to have a narrow fuselage and the fairing 39 minimises aerodynamic drag allowing the forward speed of the helicopter to be maximised. The fairing 39 also reduced vertical drag due to rotor downwash enhancing lift capability.

By fitting a common design of support channel 20 to different types of missiles the invention allows for different types of missiles to be carried in the store and in the turret 17 at the same time, and the numbers and types of missiles can be selectively varied as dictated by operational requirements.

Whilst one embodiment has been described and illustrated it will be understood that many modifications may be made without departing from the scope of the invention. For example, where space permits, the missiles 16 may be stored longitudinally within the fuselage 11 and may conveniently be located in two generally vertical stacks with the second guide means 22 being adapted to selectively move the missiles 16 downwardly into the transfer position 16a. The missile handling system may be completely automatic in operation or, alternatively, crew selection of the various reloading and missile selection may be provided. The turret 17 may be adapted to carry any desired number of missiles and may be retractable into the fuselage 11 to eliminate aerodynamic drag. Alternatively a retractable fairing may be provided to minimise such drag whilst the turret is non-operational. The adaptors 19 may be formed integral with the missile 16. Other known sight systems such as a roof mounted sight, a mast mounted sight or a helmet mounted sight may be used. Any appropriate guide and drive means may replace that of the illustrated embodiment and track means adapted for releasable attachment externally of the fuselage 11 could be used in order that the helicopter can readily be converted between missile carrying and other roles.

What is claimed is:

1. A helicopter having a fuselage, storage means for storing a plurality of missiles longitudinally of the fuselage, reloadable turret means beneath the fuselage for movement in azimuth and elevation, transfer means for transferring a missile from said storage means to said turret means, said storage means comprising generally vertical tracks in the side walls and lower wall of the fuselage, spaced apart adaptors attached to the missiles, support channels slidably supporting said adaptors and missiles, and longitudinal spaced-apart attachment lugs on said support channels located in said generally vertical tracks.

2. A helicopter as claimed in claim 1, wherein said turret means supports two missiles in side by side relationship.

3. A helicopter as claimed in claim 1, wherein said transfer means comprise a powered endless chain for sliding the adaptors and attached missile forwardly out of the support channel and into a mating channel on the turret means.

4. A helicopter as claimed in claim 3, wherein said transfer means include a transfer channel bridging a space between said storage means and said turret means.

5. A helicopter as claimed in claim 3, wherein said endless chain includes at least two protruding spigots for engagement in transfer adaptors attached adjacent the ends of the missile.

6. A helicopter as claimed in claim 1 and including drive means for driving the support channels and attached missiles down the vertical tracks and into a transfer position generally beneath said lower wall for transferring selectively to said turret means.

7. A helicopter as claimed in claim 6 and including release means for automatically releasing said support channels on movement along the tracks beyond said transfer position.

8. A helicopter as claimed in claim 6, wherein said drive means comprise powered endless chains located in said tracks.

9. A helicopter as claimed in claim 8, wherein said chains include protruding spigots for engagement in mating apertures in the attachment lugs on the support channels.

10. A helicopter as claimed in claim 1, wherein said storage means is arranged to support the missiles externally of said vertical side walls and said lower horizontal wall of the fuselage.

11. A helicopter as claimed in claim 10, wherein the generally vertical tracks of said storage means are formed within the side walls and lower wall of the fuselage so as to be generally flush with the respective outer surfaces.

12. A helicopter as claimed in claim 10, wherein fairings are provided to protect said externally located missiles.

* * * * *